July 28, 1936.  N. GREENWELL  2,049,259
LEAKPROOF BOLT
Filed June 9, 1933
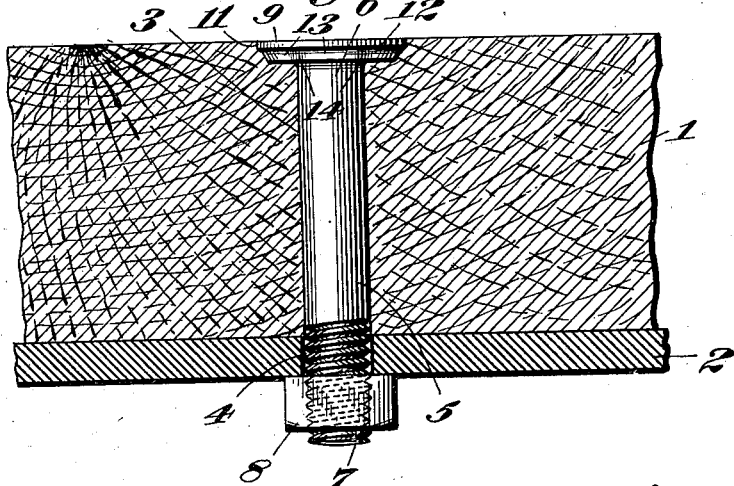
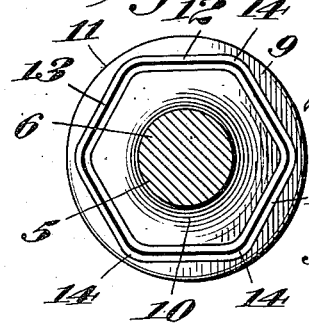
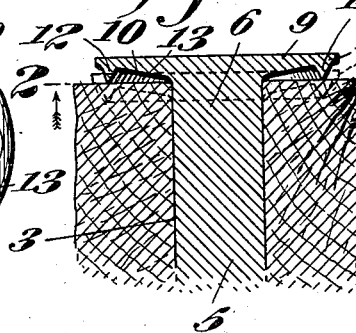
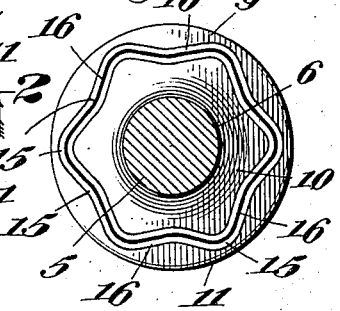
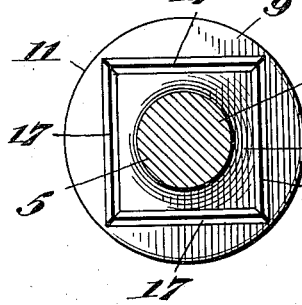
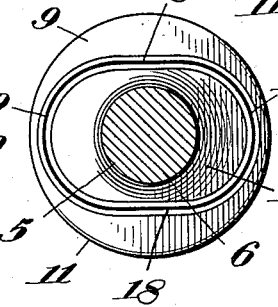
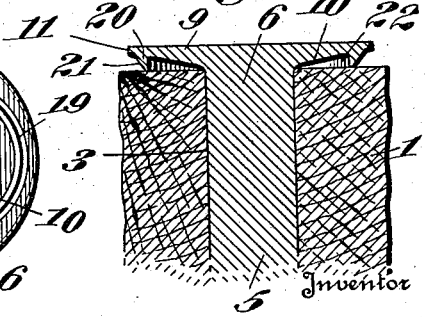
Inventor
Nevil Greenwell.
By R. S. A. Dougherty
Attorney Patented July 28, 1936

2,049,259

UNITED STATES PATENT OFFICE 2,049,259

LEAKPROOF BOLT

Nevil Greenwell, Bethlehem, Pa., assignor to Bethlehem Steel Company, a corporation of Pennsylvania Application June 9, 1933, Serial No. 674,989

2 Claims. (Cl. 85—9)

My invention relates to improvements in bolts and more especially to bolts adapted for use in securing members of wood to other members of wood or of metal such for example as the flooring or sheathing of railway cars and for similar purposes.

It has been the usual practice in making bolts of this type to form the shank adjacent to the under side of the bolt head square in cross-section, or to provide the shank of the bolt with laterally extending fins to prevent rotation of the bolt when it is forced home in the wooden member. It has been found however that bolts formed in this manner although adapted to effectively prevent rotation of the bolt, spread and disrupt the fiber of the wood in which they are installed and leave the wood surrounding the bolt accessible to water or moisture.

One of the objects of my invention relates to means for securing a tight leak-proof joint between the timber and both the head and shank of the bolt to prevent water or moisture from lodging beneath the head and around the shank of the bolt thereby causing rotting and deterioration of the wood.

Another object of my invention is to provide a bolt with a plain cylindrical shank and form the head of the bolt in such a manner as to prevent rotation and can be readily drawn into the timber to which it is applied so as to be flush with the face thereof.

Another object of my invention is to provide a bolt with the above mentioned advantages that can be economically manufactured, either by hot or cold process, in the usual bolt-forming machine.

Referring now to the accompanying drawing in which like characters of reference indicate like parts;

Figure 1 is a view in section, with the bolt and nut in elevation, illustrating the application of my invention;

Fig. 2 is a transverse sectional view of the bolt taken on the line 2—2 of Fig. 3, showing a continuous rib wedge shaped in cross section extending from the underside of the head of the bolt, the plan being hexagonal.

Fig. 3 is a sectional view showing a fragment of the wooden member and the top portion of the bolt taken on a vertical plane medially of the shank of the bolt showing the position the head of the bolt will assume just before the rib enters the wooden member.

Figs. 4, 5 and 6 are transverse sectional views similar to Fig. 2, but showing alternative forms of bolt heads with the plan of the ribs on the under surface of the heads of the bolts as sinuous, square and oval respectively.

Fig. 7 is a sectional view similar to Fig. 3, but showing a chisel-shaped rib in cross-section on the underside of the head of the bolt with the inclined portion of the rib on the outside thereof, and;

Fig. 8 is a vertical sectional view of the head portion of a bolt with a chisel-shaped rib with the inclined portion on the inside of the rib.

Referring now to the numbers of reference on the drawings and first to Figs. 1 to 3, the numeral 1, indicates a fragment of a wooden member which may be a portion of a car floor or sheathing or the like which is secured to a metal framework, sill or brace 2 by means of bolts. The members 1 and 2 are perforated as at 3 and 4 respectively to receive the cylindrical shank 5 of my improved bolt 6, which is screw-threaded at one end as at 7 to receive a nut 8, while the opposite end of the shank of the bolt is formed with an upset head 9 which is preferably made thin and disk shaped or annular but it may be formed square, oval, hexagonal or any other shape if desired without departing from the spirit of my invention.

The top surface of the head of the bolt is preferably made flat while the under-side surface 10 of the head is inclined slightly upwardly and outwardly from the shank 5 to the annular peripheral edge 11 of the bolt head. A continuous rib 12 wedge shaped in cross-section is formed integral with the head, extends downwardly at an intermediate point from the inclined underside surface 10. The plan of said rib being hexagonal having straight portions 13 parallel with each other with apices or corners 14.

In securing the members 1 and 2 together the shank 5 of the bolt 6 is inserted in the perforations 3 and 4 until the lower or penetrating edge of the rib engages the surface of the wooden member 1 as indicated in full lines in Fig. 3. The nut 8 is then screwed on the threaded end 7 of the bolt until it engages the face of the metal member 2, it is then screwed home until the lower surface of the head of the bolt is flush with the side of the wooden member as indicated in dotted lines in Fig. 3, or the nut can be tightened until the top surface of the head of the bolt is flush with the side of the wooden member as indicated in Fig. 1. In either case as shown in Figs. 1 and 3 just as soon as the cutting edge of the rib engages and enters the side face of the wooden member 1, a seal is formed and owing to the shape of the rib the bolt is prevented from turning while the head of the bolt continues to be drawn into the wooden member, as the nut is tightened.

In Figs. 4 to 8 I have shown alternative forms of continuously extending ribs, but otherwise the bolt is made similar to the bolt described in Figs. 1 to 3 and the same reference numerals will apply thereto.

Fig. 4 illustrates a zig-zag rib having their apices 15 connected by portions 16, these portions on one side of the shank of the bolt being parallel to straight portions on the other side of said shank, or this rib may be formed crinkly or corrugated if desired.

It is manifest that other forms of ribs can be used without departing from the spirit of my invention. Thus a circular rib formed on the under side of the bolt head and disposed eccentrically with respect to the shank performs the dual function of continuous sealing and of resisting the turning of the bolt, which function is one of the novel features of my invention. It is of course understood that the head of the bolt may be pressed or hammered into its seat before the nut is drawn up tightly in the bolt. My sealing device is particularly useful in connection with sheathing bolts, deck bolts and the like. It may be used in conjunction with soft metals such as lead or copper and is also an effective gas seal in such a combination. An important feature of my invention is that even at the time of initial penetration of the tip of the rib into material to be fastened it effectively functions as a sealing device and also as a device to resist rotation of the fastener member.

In Fig. 5 I have illustrated the continuous rib as square in outline, having straight sides 17 parallel with each other on opposite sides of the shank 5 of the bolt.

In Fig. 6 I have shown a continuous rib of oval outline having straight parallel oppositely disposed portions 18 connected by arc-shaped portions 19.

In Fig. 7 I have shown a chisel-shaped rib 20 in cross-section having the beveled portion 21 on the outside of the rib and the straight portion 22 on the inside of the rib in parallel relation with the shank of the bolt, and in Fig. 8, I have shown a chisel-shaped rib 23 with a straight outside surface 24 and a beveled inside portion 25.

The plan of the ribs shown in Figs. 7 and 8 may be in outline any one of the designs shown in Figs. 1 to 6 inclusive if desired.

Although I have shown and described my invention in considerable detail, I do not wish to be limited to the exact and specific details shown and described, but may use such substitutions, modifications or equivalents thereof, as are embraced within the scope of my invention, as pointed out in the claims.

Having thus described my invention what I claim as new and desire to secure by Letters Patent is:

1. A fastener member comprising a shank cylindrical through its length, a head having an inclined under-side surface, and a continuous penetrating rib extending from the inclined under-side surface of the head at a point intermediate the cylindrical shank and the periphery of the head adapted to be countersunk into the member through which the shank of the fastening device extends to hold it against rotation and provide a sealing engagement with the said member and to prevent leakage beneath the head and around the shank of the fastening device, said rib being in a plane wholly above the shank and having straight portions on one side of the shank in parallel alignment and in staggered relation with the straight portions on the opposite side of the shank adapted to prevent rotation of the fastener member as it is drawn into the wood surface independent of any means on the shank.

2. A watertight bolt for wood, comprising a head and a cylindrical shank having a threaded end, a nut on the threaded end of the shank, said head having an inclined under-side face with a sinuous rib at an intermediate point between the periphery of the head and the shank of the bolt, said sinuous rib being in a plane wholly above the shank and having straight portions on one side of the shank in parallel alignment and in staggered relation with the straight portions on the opposite side of the shank of the bolt adapted to be drawn into the wood by said nut and prevent the bolt from turning independent of any means on the shank and effect a sealing engagement with the wood under the head and around the shank when the bolt is drawn up by the nut.

NEVIL GREENWELL.